(12) United States Patent
Wiberg et al.

(10) Patent No.: US 11,511,746 B2
(45) Date of Patent: Nov. 29, 2022

(54) METHOD FOR ESTABLISHING A PATH FOR A VEHICLE

(71) Applicant: Volvo Truck Corporation, Gothenburg (SE)

(72) Inventors: Wilhelm Wiberg, Askim (SE); Stefan Bergquist, Gothenburg (SE); Edvin Valtersson, Sävedalen (SE); Mats Sköld, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/054,422

(22) PCT Filed: May 11, 2018

(86) PCT No.: PCT/EP2018/062188
§ 371 (c)(1),
(2) Date: Nov. 10, 2020

(87) PCT Pub. No.: WO2019/214828
PCT Pub. Date: Nov. 14, 2019

(65) Prior Publication Data
US 2021/0213949 A1    Jul. 15, 2021

(51) Int. Cl.
*B60W 30/165*     (2020.01)
*G08G 1/00*       (2006.01)
(Continued)

(52) U.S. Cl.
CPC .......... *B60W 30/165* (2013.01); *B60W 30/12* (2013.01); *B60W 40/072* (2013.01);
(Continued)

(58) Field of Classification Search
CPC .. B60W 30/165; B60W 30/12; B60W 40/072; B60W 50/00; B60W 60/0015;
(Continued)

(56) References Cited

U.S. PATENT DOCUMENTS 6,732,024 B2   5/2004   Wilhelm Rekow et al.
7,734,387 B1 * 6/2010   Young .................. G05D 1/0278
                                                 701/533
(Continued)

FOREIGN PATENT DOCUMENTS

CN      106909144 A  *  6/2017
DE      102015010559 A1    3/2016
(Continued)

OTHER PUBLICATIONS

International Preliminary Report on Patentability for PCT/EP2018/062188, dated Jun. 15, 2020, 16 pages.
(Continued)

*Primary Examiner* — Behrang Badii
*Assistant Examiner* — Jay Khandpur
(74) *Attorney, Agent, or Firm* — Withrow & Terranova, PLLC

(57) ABSTRACT

The invention relates to a method for a follower vehicle (2) following a lead vehicle, comprising—determining a position (PL) and a heading (HL) of the lead vehicle (1), —determining a position (PF) and a heading (HF) of the follower vehicle (2), —subsequently establishing a path for the follower vehicle (2) by fitting a curve (C1) to said positions (PL, PF) and said headings (HL, HF), —and controlling the follower vehicle (2) so as to move along the established path.

12 Claims, 6 Drawing Sheets

(51) Int. Cl.
*H04W 4/46* (2018.01)
*B60W 30/12* (2020.01)
*B60W 40/072* (2012.01)
*B60W 50/00* (2006.01)
*G06V 20/58* (2022.01)
*B60W 60/00* (2020.01)
*G05D 1/02* (2020.01)

(52) U.S. Cl.
CPC .............. *B60W 50/00* (2013.01); *G06V 20/58* (2022.01); *G08G 1/22* (2013.01); *H04W 4/46* (2018.02); *B60W 60/0015* (2020.02); *B60W 2050/0075* (2013.01); *B60W 2554/4044* (2020.02); *B60W 2556/65* (2020.02); *G05D 1/0212* (2013.01)

(58) Field of Classification Search
CPC ..... B60W 2554/4044; B60W 2556/65; B60W 2050/0075; H04W 4/46; G06V 20/58; G08G 1/22; G05D 1/0212
See application file for complete search history.

(56) References Cited

U.S. PATENT DOCUMENTS

| | | |
|---|---|---|
| 9,120,485 B1 | 9/2015 | Dolgov |
| 9,927,816 B2 | 3/2018 | Li et al. |
| 2002/0165649 A1* | 11/2002 | Wilhelm Rekow .. G05D 1/0295 701/466 |
| 2005/0171684 A1* | 8/2005 | Turner ................. G05D 1/0219 701/468 |
| 2007/0260384 A1* | 11/2007 | Romanchok .......... B60W 40/13 701/1 |
| 2013/0090802 A1 | 4/2013 | Curtis et al. |
| 2015/0075954 A1* | 3/2015 | Mizuno ................... B60Q 1/42 200/61.3 |
| 2015/0370255 A1 | 12/2015 | Harvey |
| 2016/0176402 A1 | 6/2016 | Andersson et al. |
| 2016/0375901 A1 | 12/2016 | Di Cairano et al. |
| 2017/0147005 A1 | 5/2017 | Ramm et al. |
| 2017/0168503 A1 | 6/2017 | Amla et al. |
| 2017/0168505 A1* | 6/2017 | Meinecke ........ G08G 1/096725 |
| 2017/0199523 A1 | 7/2017 | Barton-Sweeney et al. |
| 2017/0213466 A1 | 7/2017 | Azar |
| 2017/0329348 A1 | 11/2017 | Li et al. |
| 2018/0025643 A1 | 1/2018 | Yamamoto |
| 2018/0082590 A1* | 3/2018 | MacNeille ....... G08G 1/096791 |
| 2018/0099667 A1 | 4/2018 | Abe et al. |
| 2018/0113448 A1* | 4/2018 | Nagda ................ G05D 1/0005 |
| 2018/0237012 A1 | 8/2018 | Jammoussi et al. |
| 2018/0348767 A1 | 12/2018 | Jafari Tafti et al. |

FOREIGN PATENT DOCUMENTS

| | | |
|---|---|---|
| EP | 2637072 A1 | 9/2013 |
| KR | 101556171 B1 | 9/2015 |
| SE | 537603 C2 | 7/2015 |
| WO | 2015/047179 A1 | 4/2015 |
| WO | 2015047175 A1 | 4/2015 |

OTHER PUBLICATIONS

International Preliminary Report on Patentability for PCT/EP2018/079940, dated May 26, 2020, 13 pages.
International Search Report and Written Opinion for PCT/EP2018/062188, dated Jan. 25, 2019, 12 pages.
International Search Report and Written Opinion for PCT/EP2018/079940, dated Feb. 12, 2019, 17 pages.
Non-Final Office Action for U.S. Appl. No. 17/054,434, dated May 11, 2022, 39 pages.

* cited by examiner

METHOD FOR ESTABLISHING A PATH FOR A VEHICLE

This application is a 35 USC 371 national phase filing of International Application No. PCT/EP2018/062188, filed May 11, 2018, the disclosure of which is incorporated herein by reference in its entirety.

TECHNICAL FIELD

The invention relates to a method for a follower vehicle following a lead vehicle. The invention also relates to a computer program, a computer readable medium, a control unit and a vehicle.

The invention can be applied in heavy-duty vehicles, such as trucks and buses. Although the invention will be described with respect to trucks, the invention is not restricted to this particular vehicle, but may also be used in other vehicles such as cars.

BACKGROUND

A follower vehicle following, e.g. by means of vehicle-to-vehicle (V2V) communication, a lead vehicle, may in some cases be referred to as autonomous vehicle following, or auto-following. Such following could be applied to a string of vehicles, comprising the lead vehicle and the follower vehicle following the lead vehicle, e.g. by means of V2V communication. V2V communication involves information sent between a vehicle, and one or more surrounding vehicles, over a wireless communication channel. In addition to V2V communication, the follower vehicle could follow the lead vehicle by means of sensors.

Autonomous vehicle following allows the removal of the driver from the follower vehicles and have the vehicles follow the lead vehicle fully automatically. Thereby, in addition to longitudinal follower vehicle control, an automatic lateral follower vehicle control is used. For example, in a string, there may be a control of the longitudinal movements of the follower vehicle, as well as the lateral movements of the follower vehicle. A follower vehicle following the lead vehicle in a string, may in some cases be referred to as driver-less platooning. Driverless follower vehicles allow for cost reductions, and the removal of the "human factor" which may provide increased safety.

The longitudinal control of the follower vehicle could be provided by means of Cooperative Adaptive Cruise Control (CACC). In platooning, e.g. by means of CACC, vehicle convoys are driven with short distances between the vehicles, whereby the vehicles form a string.

The string may be formed of a row of vehicles, one following another. To achieve this with a high safety, a control unit of each vehicle may receive information from surrounding vehicles via V2V communication. For example, such shared information may include brake pressure, engine torque, engine RPM, accelerator pedal position, engine manifold pressure, vehicle speed, and/or radar/lidar data. Thus, it is understood that the V2V communication may provide for controlling the velocity and/or acceleration of a vehicle the string in dependence on the signals received from another vehicle in the string.

Alternatively, the longitudinal control of the follower vehicle could be provided by means of Adaptive Cruise Control (ACC). More generally, a string does not necessarily have to involve CACC, but can involve some other technology for longitudinal control of the follower vehicle(s).

Benefits with platooning include increased fuel efficiency, provided by a reduced air-drag due to short distances between vehicles, and provided by improved vehicle control due to more accurate information about the preceding vehicle. A further benefit is an improved traffic flow due to the small delay of the V2V data.

The lateral control of the follower vehicle could be provided by means of position coordinates received from the lead vehicle. The position coordinates may be sent by V2V communication. The lateral control of the follower vehicle could also be provided by means of the Global Navigation Satellite System (GNSS), e.g. using the Global Positioning System (GPS). In some cases, the lateral control may be provided by means of sensors, e.g. by finding the rear-most part of the vehicle ahead and tracking it.

US2013090802 describes path estimation for autonomous vehicle following based on the acquisition of waypoints associated with a leader. The acquired waypoints may be pre-processed, including for example filtering, interpolation and cropping, to improve accuracy and then spline fitted to define a following path that is calculated to estimate the traversed path of the leader. The autonomous following vehicle may then be driven along the calculated path.

Notwithstanding said benefits, there is still room for improvement of known autonomous vehicle following strategies.

SUMMARY

An object of the invention is to increase the safety in autonomous vehicle following. Another object of the invention is to simplify autonomous vehicle following.

The objects are reached with a method according to claim 1. Thus, the invention provides a method for a follower vehicle following a lead vehicle, comprising
  determining a position and a heading of the lead vehicle,
  determining a position and a heading of the follower vehicle,
  subsequently establishing a path for the follower vehicle by fitting a curve to said positions and said headings,
  and controlling the follower vehicle so as to move along the established path.

The lead vehicle may drive ahead of the follower vehicle. The follower vehicle's following of the lead vehicle may be an autonomous vehicle following. The method may involve a plurality of follower vehicles following the lead vehicle.

The determined heading of the lead vehicle is preferably at the determined position of the lead vehicle. The determined heading of the follower vehicle is preferably at the determined position of the follower vehicle.

Determining the positions and headings of the lead vehicle and the follower vehicle may involve determining the absolute position and the absolute heading of the lead vehicle. Determining the positions and headings of the lead vehicle and the follower vehicle may involve determining the absolute position and the absolute heading of the follower vehicle. However, in some embodiments, the determined position of the lead vehicle may be the lead vehicle position in relation to the follower vehicle position. In some embodiments, the determined heading of the lead vehicle may be the lead vehicle heading in relation to the follower heading. The path may be calculated based on the follower vehicle's position and heading to the lead vehicle's position and heading.

Embodiments of the invention provides for establishing said path for the follower vehicle by fitting the curve to said positions and said headings, after said positions and said headings have been determined. The curve fitted to said positions and said headings may be a smooth curve. The curve may take the follower vehicle from its position and heading to the lead vehicle's position and heading.

The position and a heading of the lead vehicle may, for example, be acquired by means of the Global Navigation Satellite System (GNSS), e.g. using the Global Positioning System (GPS). The position and a heading of the lead vehicle may be sent from the lead vehicle to the follower vehicle via V2V communication. Thus, the follower vehicle may receive information relating to the position coordinates and the heading of the lead vehicle. In some cases, the position and a heading of the lead vehicle may be provided by means of sensors of the follower vehicle.

The position and the heading of the lead vehicle may be determined at the same time. Herein, the lead vehicle position and heading, determined at the same time, are jointly referred to as a lead vehicle position and heading data set. The position and the heading of the follower vehicle may be determined at the same time. Herein, the follower vehicle position and heading, determined at the same time, are jointly referred to as a follower vehicle position and heading data set. Further, the lead vehicle position and heading data set, and the follower vehicle position and heading data set, may be determined at substantially the same time. In some embodiments, the follower vehicle position and heading data set is determined when the lead vehicle position and heading data set is received by the follower vehicle.

Preferably the position of the lead vehicle is a position of a reference point of the lead vehicle. Preferably, the lead vehicle reference point is fixed in relation to the lead vehicle. Preferably, the lead vehicle reference point is located at a front axle of the lead vehicle. Preferably the position of the follower vehicle is a position of a reference point of the follower vehicle. Preferably, the follower vehicle reference point is fixed in relation to the follower vehicle. Preferably, the follower vehicle reference point is located at a front axle of the follower vehicle. Where the lead vehicle and the follower vehicle form parts of a string, each vehicle in the string may present a reference point, the position of which indicates the position of the respective vehicle.

Preferably, the reference points of the vehicles are at the same relative position in the respective vehicle, for example at the respective front axle. Thereby, the vehicle motion patterns may be the same. In some embodiments, the method can comprise determining the position of a preliminary point on the lead vehicle. Thereby, determining the position of the lead vehicle may comprise determining the position of the lead vehicle reference point based on the position of the lead vehicle preliminary point and a known spatial relationship between the preliminary point and the reference point. Similarly, the method can comprise determining the position of a preliminary point on the follower vehicle, wherein determining the position of the follower vehicle may comprise determining the position of the follower vehicle reference point based on the position of the follower vehicle preliminary point and a known spatial relationship between the preliminary point and the reference point.

It should be noted that, as the follower vehicle follows the lead vehicle, as the latter is moving ahead, steps of the method may be repeated. Thereby a plurality of sequential positions and headings of the lead vehicle may be determined. Further, a plurality of sequential positions and headings of the follower vehicle may be determined. In some embodiments, after each determination of the lead vehicle's position and heading, and after each determination of the follower vehicle's position and heading, a path for the follower vehicle is established by fitting a curve to the determined positions and headings. Thereby, a sequence of paths may be created as the vehicles move along. Thus, as the vehicles move along, the positions and headings of lead vehicle and follower vehicle may be repetitively updated, and the follower vehicle path may be repetitively updated.

The invention makes it possible to establish the path for the follower vehicle without data on the lead vehicle movement history. Instead the path may be established based on the present position and a heading of the lead vehicle. This provides significant advantages compared to said known method in US2013090802, where a path estimation is based on the acquisition of waypoints associated with a leader. In the known method, the estimated path will depend on the route that the lead vehicle has taken to its present position. The invention allows for choosing the path without any consideration for such a historical lead vehicle route. This provides a more flexible path choice, which is beneficial, in particular where the surroundings involve relatively large amounts of free space around the vehicles. Such surrounds may occur for example on a motorway, or in a truck loading area, e.g. in a container shipping harbor.

By the invention it is possible to avoid, where not necessary, the follower vehicle mimicking everything the lead vehicle is doing. For example, where the lead vehicle is driven by a person who controls the lead vehicle so as to sway as it is moved forward, the invention may provide for the follower vehicle to create, while still following the lead vehicle, its own path so as to avoid the swaying. Thereby, safety in autonomous vehicle following is increased.

Further the invention allows for the amount of data transferred from the lead vehicle to the follower vehicle to be considerably reduced. More specifically, updating the position and heading of the lead vehicle may require a considerably reduced bandwidth, compared to the known method with path estimation based on waypoints. In particular, the frequency of the data transfer may be reduced significantly. Thereby, autonomous vehicle following may be simplified.

In some embodiments, a plurality of follower vehicles may follow a lead vehicle. Thereby, a position and a heading of an additional follower vehicle may be determined, wherein subsequently a path for the additional follower vehicle is established by fitting a curve to the position and heading of the lead vehicle and the position and heading of the additional follower vehicle. Thereby, the additional follower vehicle may be controlled so as to move along the established path. Alternatively, or in addition, a follower vehicle, herein referred to as a first follower vehicle, may fill the role of a lead vehicle for an additional follower vehicle, in that a position and a heading of the first follower vehicle is determined, a position and a heading of the additional follower vehicle is determined, subsequently a path for the additional follower vehicle is established by fitting a curve to said positions and said headings, and the additional follower vehicle is controlled so as to move along the established path. For example, the first follower vehicle may fill the role of a lead vehicle, where the additional vehicle, for some reason, doesn't receive data from the lead vehicle for the first follower vehicle.

Preferably, the curve fitting comprises creating the curve so as to be tangential to each of said headings at a respective of said positions. Thereby, a smooth path, guiding the follower vehicle to the present position and heading of the lead vehicle, may be created. Preferably, the curve is a polynomial of a degree of at least three. This allows creating a path with a portion having a curvature in one direction, and another portion having a curvature in the other direction. Thereby, paths taking the follower vehicle between a variety of relative positions and headings are allowed.

In some applications of the invention, the lead vehicle is standing still, when the path for the follower vehicle is established. Thereby, the invention could be advantageously applied to a situation where a string of platooning vehicles is to be formed. The lead vehicle may be driven by a driver. The follower vehicle may be an autonomous follower. During an initiation of the string the lead vehicle may be standing still. Thereby, the heading of the lead vehicle may have been determined when the lead vehicle was in a transition from moving to standing still. The heading of the lead vehicle may be stored, e.g. by a control unit of the lead vehicle. After receiving the position and the heading of the lead vehicle, and after having determined the position and heading of the follower vehicle, the follower vehicle may establish the path for the follower vehicle by fitting a curve to said positions and said headings. Thereupon, the follower vehicle may be controlled so as to move along the established path. Thereby, the follower vehicle may move so as to end up behind the lead vehicle. Thereby, the follower vehicle may move so as to end up behind the lead vehicle, and having substantially the same heading as the lead vehicle. The follower vehicle may park behind the lead vehicle.

This enables a possibility of initializing an auto-follower platoon without the need for drivers in the follower vehicles at any stage during the initiation. In some implementations, a plurality of follower vehicles may line up behind a lead vehicle. Thereby, a first follower vehicle may fill the role of a lead vehicle for an additional follower vehicle, in that a position and a heading of the first follower vehicle is determined, a position and a heading of the additional follower vehicle is determined, subsequently a path for the additional follower vehicle is established by fitting a curve to said positions and said headings, and the additional follower vehicle is controlled so as to move along the established path.

It should be noted that, advantageously, embodiments of the invention allow the follower vehicle to arrive behind the lead vehicle, without having followed the same path as the lead vehicle, or even having arrived from the same direction as the lead vehicle.

In some applications of the invention, the lead vehicle may, during an initiation of the string, be driving, e.g. slowly or at a relatively high speed. Thereby, the follower vehicle, which is to form a string with the lead vehicle, and possibly other follower vehicles, may be driving at a distance from the lead vehicle, which is larger than the distance between the vehicles when the string is formed. After receiving the position and the heading of the lead vehicle, and after having determined the position and heading of the follower vehicle, the follower vehicle may establish the path for the follower vehicle by fitting a curve to said positions and said headings. Thereby, the follower vehicle may move so as to end up behind the lead vehicle, and having substantially the same heading as the lead vehicle.

In some embodiments, said path is established in a first control mode of the follower vehicle,
the method further comprising generating operational data which is at least partly related to the operation of the lead vehicle,
and determining based on the operational data whether to control the follower vehicle in the first mode or in a second mode,
the second mode comprising
determining a plurality of positions of the lead vehicle as the lead vehicle moves,
and establishing a path for the follower vehicle by fitting a curve to at least some of the plurality of lead vehicle positions.

Thus, the first mode may involve controlling the follower vehicle so as to move along a path established by fitting a curve to positions and headings of the lead vehicle and the follower vehicle. The second mode may involve controlling the follower vehicle so as to move along a path established by fitting a curve to at least some of a plurality of lead vehicle positions. Such lead vehicle positions are herein also referred to as waypoints. Thus, in the second mode, the follower vehicle may follow a trail created by the lead vehicle.

Thereby, a possibility to select the first or the second mode, e.g. depending on the operational data is provided. For example, the operational data may include surroundings data, regarding the surroundings of the lead vehicle and/or the follower vehicle, e.g. environmental conditions, or upcoming objects detected by one or more sensors of the lead vehicle. The operational data may include road data, including one or more features of a road on which the vehicles are travelling, e.g. the road condition, or the road type, such as whether the road is a motorway, or a street in a city. The operational data may include lead vehicle driver data, regarding lead vehicle control actions initiated by a driver of the lead vehicle, for example driver input data, and/or data regarding the lead vehicle driver condition. The operational data could include the lead vehicle movement, such as the lateral acceleration and/or the yaw rate thereof. The operational data may include data generated by the lead vehicle, the follower vehicle, or a vehicle ahead of the lead vehicle.

Thus, in the second mode, the exact behavior of the lead vehicle may be replicated by the follower vehicle. This may be advantageous in some circumstances. However, in other circumstances it may be more beneficial that a track between the two vehicles, determined based on the positions and heading of the vehicles, is followed by the follower vehicle. Thus, when a situation is assessed, a fitting lateral control strategy may be chosen.

For example, lead vehicle driver data, based on lead vehicle speed and lead vehicle steering wheel movements, combined with surroundings data and road data, could indicate that the lead vehicle driver is swerving often without this being called for by the conditions. Such swerving could be an indication of a "nervous" driving behavior of the lead vehicle, which is not wanted in the follower vehicle. In such an example, it may be determined to control the follower vehicle in the first mode. This may give a calm and comfortable control of the follower vehicle in a situation where a certain deviation from the lead vehicle path is acceptable. Thereby, the lead vehicle might sway a bit back and forth within the lane, e.g. due to it being driven by a human driver. The follower vehicle may thereby smoothen out that swaying and can attempt a straighter line reducing the swaying.

However, if road data and/or surroundings data indicate that the follower vehicle is in a relatively narrow situation, such as in a roundabout, a motorway exit, or a sharp curve, on a narrow and/or curvy road, such as a rural road, it may be vital that a movement of the lead vehicle is at least substantially replicated. The follower vehicle control may want to ensure that the follower vehicle is not cutting any corner. In such a case, it may be determined to control the follower vehicle in the second mode.

Thereby, a flexible control of the follower vehicle is provided, allowing fully automated following in a variety of situations, which may occur, e.g. in a hub-to-hub scenario, where some part of a trip is more narrow and curvy than others. Thus, operational conditions may be registered or analyzed to form operational data, and the mode for the lateral control strategy of the follower vehicle may be selected based on the operational data.

This may be done continuously or repetitively, so that each time the operational conditions change, the lateral control strategy is changed accordingly.

It should be noted that in some embodiments, the second mode may be adjusted, so that instead of following exactly in the track of the lead vehicle, the path established for the follower vehicle could be an approximation of said track, e.g. by fitting a curve to less than all of the plurality of lead vehicle positions. In some embodiments, the second mode adjustment could include adjusting the number of lead vehicle waypoints used for the curve adaption for the path for the follower vehicle to follow. In some embodiments, the adjusted second mode comprises determining a plurality of positions of the lead vehicle as the lead vehicle moves, and establishing a path for the follower vehicle by fitting a curve to a number of the lead vehicle positions, which number is lower than the number of lead vehicle positions to which a curve is fitted in the un-adjusted second mode. Such an adjustment could be based on one or more differences between the lead vehicle and the follower vehicle, e.g. where the vehicles are of different types of tractor and trailer combinations. Thus, an adjustment of the second mode could be based on data regarding one or more properties and/or restrictions of the lead vehicle as well as the follower vehicle.

Preferably, at least one or more parts of the operational data is generated by the lead vehicle. Preferably, the operational data includes surrounding data generated by the lead vehicle. Preferably, at least one or more parts of the operational data is sent from the lead vehicle to the follower vehicle by vehicle-to-vehicle (V2V) communication. Thereby, the adaption of the path following algorithm to different scenarios is done by the vehicle that has the best knowledge about what kind of situation the vehicles are currently in, i.e. the lead vehicle. Thus, the current situation is preferably assessed by means of data from the lead vehicle. The operational data may include lead vehicle movements, such as lateral acceleration, and/or yaw rate. The operational data may include one or more upcoming objects seen by lead vehicle, such as an obstacle in the way, that requires some sort of maneuver to avoid. The operational data may include driver input information, such as a steering wheel angle and/or torque. For example, if the lead vehicle driver puts in a lot of steering effort, indicated by a high steering wheel torque and/or a big angle on the steering wheel, a determination to control the follower vehicle in the second mode may be justified by stricter requirements on the follower vehicle to follow the lead vehicle more exactly, and on the follower vehicle control to be more active, e.g. "nervous", to catch even small control adjustments of the lead vehicle.

Thus, in beneficial embodiments of the invention, during autonomous vehicle following, the path choice control strategy for a follower vehicle is adjusted based on data in the lead vehicle.

The operational data may be indicative of a change of a lead vehicle control strategy, from a first lead vehicle control strategy to a second lead vehicle control strategy, while the follower vehicle is controlled in the first mode, the method comprising determining, based on the operational data indicative of the lead vehicle control strategy change, to change to controlling the follower vehicle in the second mode.

The first lead vehicle control strategy may for example involve remaining in a road lane, and keeping the lead vehicle speed substantially constant, or within a speed interval, which may be predetermined. As discussed below, the second lead vehicle control strategy may be an emergency maneuver, such as a maneuver to avoid an obstacle ahead of the lead vehicle. The second lead vehicle control strategy may alternatively be a standard maneuver of the lead vehicle, such as a lane change of the lead vehicle. Thereby, the choice between the first and second modes of controlling the follower vehicle, may be provided e.g. in a lane change situation, in which the follower vehicle control strategy selection may be important. A standard maneuver may be a type of non-emergency maneuver that is performed repetitively by a vehicle during its normal operation. Other examples, besides a lane change, may be driving through a tight curve, turning from one road onto another road, or driving through a roundabout.

In some embodiments, the operational data indicative of the lead vehicle control strategy change includes data based on a sensor of the lead vehicle. Thereby, an early indication of a change to a second lead vehicle control strategy, such as a lane change, may be provided. For example, the sensor may be a camera on the lead vehicle, by means of which the lateral position of the lead vehicle in the lane can be monitored. Data on the lateral position of the lead vehicle in the lane may be continuously or repetitively sent to the follower vehicle. The lead vehicle starting to leave the lane may indicate a lane change. By an early indication of a lane change of the lead vehicle, an early adaption of the follower vehicle control strategy may be provided.

In some embodiments, the operational data indicative of the lead vehicle control strategy change includes data about a turn signal by the lead vehicle. Such data may be provided by means of V2V signals from the lead vehicle to the follower vehicle. Alternatively, or in addition, the turn signal data may be provided by means of a sensor on the follower vehicle. In some embodiments, a combination of a lead vehicle turn signal, and lane position information indicating that the lead vehicle is starting to leave the lane, may be required for a lane change situation to be identified.

In some embodiments, the operational data indicative of the lead vehicle control strategy change includes data about a planned route of the lead vehicle. Such data may require a lead vehicle turn signal, and/or lane position information indicating that the lead vehicle is starting to leave the lane, for a confirmation that a lane change situation is identified.

As stated, the second lead vehicle control strategy may be an emergency maneuver, such as a maneuver to avoid an obstacle ahead of the lead vehicle. Thus, the operational data may be indicative of an obstacle ahead of the lead vehicle, while the follower vehicle is controlled in the first mode, the method comprising determining, based on the operational data indicative of the obstacle, to change to controlling the follower vehicle in the second mode. Thereby, a change of the follower vehicle control strategy, so as for the follower vehicle to follow the lead vehicle more exactly, may be provided as a response to the obstacle detection. A close following of the lead vehicle path may be critical for the follower vehicle to avoid the obstacle. The data about the obstacle may be obtained by means of a sensor on the lead vehicle. The obstacle data may be sent by means of V2V communication from the lead vehicle to the follower vehicle. Thereby, an early indication of the obstacle is provided for the follower vehicle. Thus, an early adjustment of the follower vehicle control strategy, to adapt to the obstacle situation, may be provided.

The operational data may be indicative of the lead vehicle entering or driving on an off-ramp or an on-ramp at a motorway, while the follower vehicle is controlled in the first mode, and determining based on the operational data, indicative of the lead vehicle entering or driving on the off-ramp or the on-ramp, to change to controlling the follower vehicle in the second mode. Thereby, a change of the follower vehicle control strategy, so as for the follower vehicle to follow the lead vehicle more exactly, may be provided as a response to the lead vehicle entering or driving on an off-ramp or an on-ramp at a motorway. On such a ramp, a close following of the lead vehicle path may be critical for the follower vehicle. The data about the off-ramp or the on-ramp may be obtained by means of GNSS. It should be noted that data on what type of road the vehicle is travelling on is also attainable from one or more on-board sensors, such as a camera and/or lidar.

In some embodiments, the method comprises establishing the path in the second mode while controlling the follower vehicle so as to move along the path established in the first mode. For example, the method may comprise determining a position and a heading of the lead vehicle, determining a position and a heading of the follower vehicle, subsequently establishing a path for the follower vehicle by fitting a curve to said positions and said headings, and controlling the follower vehicle so as to move along the established path, and simultaneously determining a plurality of positions of the lead vehicle as the lead vehicle moves, and establishing a path for the follower vehicle by fitting a curve to at least some of the plurality of lead vehicle positions. Thereby, a path estimation in one of the modes may be actively used, while the path estimation in the other mode is passive. Such a parallel path establishment may be used to verify the plausibility of the mode used. For example, while using the first mode, the difference between the trajectories of the paths of the modes may indicate whether a change to the second mode should be undertaken.

In some embodiments, the method comprises establishing the path in the first mode while controlling the follower vehicle so as to move along the path established in the second mode.

The objects are also reached with a method for a follower vehicle following a lead vehicle, comprising the lead vehicle generating operational data which is at least partly related to the operation of the lead vehicle, and determining based on the operational data whether to control the follower vehicle in a first mode or in a second mode, the first mode comprising controlling the follower vehicle so as to move along a path established according to a first algorithm, the second mode comprising controlling the follower vehicle so as to move along a path established according to a second algorithm, which is different from the first algorithm.

The adaption of the path following algorithm to different scenarios is thereby done by the vehicle that may have the best knowledge about what kind of situation the vehicles are currently in, i.e. the lead vehicle. Similarly to what has been mentioned above, in the second mode, the exact behavior of the lead vehicle may be replicated by the follower vehicle. This may be advantageous in some circumstances. However, in other circumstances it may be more beneficial that a track between the two vehicles, determined with less consideration for the exact lead vehicle track, is followed by the follower vehicle. Thus, when a situation is assessed, a fitting lateral control strategy may be chosen.

The operational data may include at least one of surroundings data, regarding the surroundings of the lead vehicle and/or the follower vehicle, road data, including one or more features of a road on which the vehicles are travelling, and lead vehicle driver data, regarding lead vehicle control actions initiated by a driver of the lead vehicle. At least one or more parts of the operational data may be sent from the lead vehicle to the follower vehicle by vehicle-to-vehicle (V2V) communication. The operational data may be indicative of a change of a lead vehicle control strategy, from a first lead vehicle control strategy to a second lead vehicle control strategy, while the follower vehicle is controlled in the first mode, and determining, based on the operational data indicative of the lead vehicle control strategy change, to change to controlling the follower vehicle in the second mode. The operational data indicative of the lead vehicle control strategy change may include data based on a sensor of the lead vehicle. Above, further examples are given of operational data, based on which it is determined whether to control the follower vehicle in the first mode or in the second mode.

In some embodiments, the first algorithm comprises determining a position and a heading of the lead vehicle, determining a position and a heading of the follower vehicle, and subsequently establishing a path for the follower vehicle by fitting a curve to said positions and said headings, the first mode comprising controlling the follower vehicle so as to move along the established path. In some embodiments, the second mode comprises determining a plurality of positions of the lead vehicle as the lead vehicle moves, and establishing a path for the follower vehicle by fitting a curve to at least some of the plurality of lead vehicle positions. In some embodiments, the first mode comprises determining a plurality of positions of the lead vehicle as the lead vehicle moves, and establishing a path for the follower vehicle by fitting a curve to a number of the lead vehicle positions, which number is lower than the number of lead vehicle positions to which a curve is fitted in the second mode. Thus, a mode change could include for example adjusting the number of lead vehicle waypoints used for a curve adaption for a path for the follower vehicle to follow.

The objects are also reached with a computer program, a computer readable medium, a control unit or a group of control units, or a vehicle. In some embodiments, the method may be performed by a single control unit in one of the vehicles, and in other embodiments, the method may be performed by a group of control units distributed in the vehicles. Thereby, one of the vehicles may be the lead vehicle. In some embodiments, the method may be performed by an external control unit, which is separate from the vehicles.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
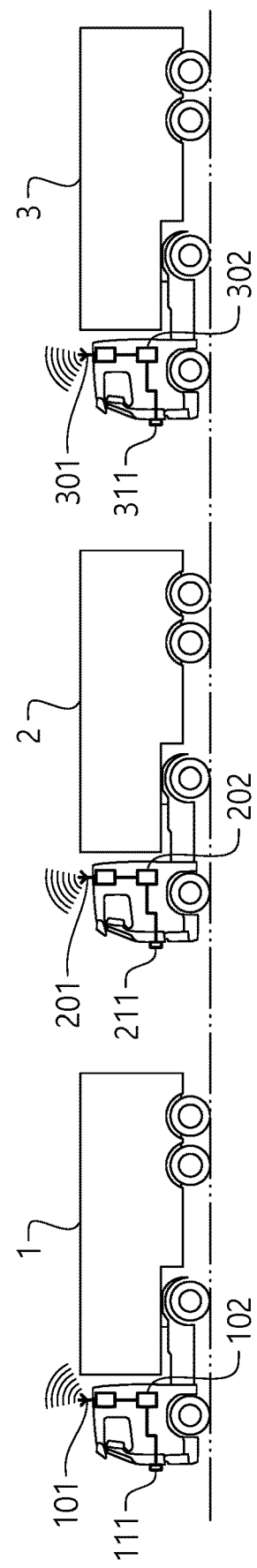
FIG. 1 is a side view of vehicles in a string of platooning vehicles.

FIG. 1 shows what is herein referred to as a lead vehicle 1, and follower vehicles 2, 3. In this example, the vehicles 1, 2, 3 are trucks with semitrailers. However, the invention is equally applicable to other types of vehicles, such as cars, buses and dump trucks.

Each of the vehicles 1, 2, 3 comprises equipment 101, 201, 301 for platooning. For longitudinal control, the vehicles comprise in this example equipment for Cooperative Adaptive Cruise Control (CACC). The platooning equipment includes means for wireless communication with a radio transmitter and a radio receiver for so called Vehicle-to-Vehicle (V2V) communication, and a data communication processing device which is arranged to communicate with a control unit 102, 202, 302 of a respective vehicle control system. The control units 102, 202, 302 are herein also referred to as a group of control units. The wireless communication could be based on any suitable industry standard format, such as WiFi, radio modem, or Zigbee. This wireless communication could alternatively be based on a non-industry standard format. The means for wireless communication is in this example also used for lateral control of the follower vehicles 2, 3.

The lead vehicle 1 and the follower vehicles 2, 3 form parts of a string comprising a plurality of vehicles platooning, using autonomous vehicle following by means of the V2V communication. The lead vehicle is at the front of the string. In this example, a first 2 of the follower vehicles follows immediately behind the lead vehicle 1. A second 3 of the follower vehicles follows immediately behind the first follower vehicle 2. In this example, only three vehicles are shown, but the string could comprise more than three vehicles, or only two vehicles.

In the string each vehicle transmits wireless signals representative of the velocity and the acceleration of the transmitting vehicle, and vehicle features including the weight and dimensions of the transmitting vehicle. The vehicle immediately behind the respective transmitting vehicle receives said wireless signals from the transmitting vehicle. Thereby, in this vehicle platooning process, each vehicle, except the lead vehicle 1, is a receiving vehicle controlled to be at a relatively short distance from a transmitting vehicle immediately in front of the respective receiving vehicle.

It should be noted however, that the invention is applicable to situations where the distance between the vehicles is relatively large. The longitudinal control of the follower vehicle(s) may, instead of CACC, utilise Adaptive Cruise Control (ACC).

The V2V communication is also used for lateral vehicle control, as described closer below. The vehicle control system of the respective receiving vehicle controls brakes, a drivetrain, and a steering function of the receiving vehicle based on the wireless signals received from the respective transmitting vehicle.

It should be noted that in some embodiments, the vehicle control system of the respective receiving vehicle may control brakes, the drivetrain, and the steering function of the receiving vehicle based on the wireless signals received from a vehicle in front of the vehicle immediately in front of the respective receiving vehicle, e.g. from the lead vehicle at the front of the string, as an alternative to or in addition to wireless signals received from the vehicle immediately in front of the respective receiving vehicle.

The vehicles 1, 2, 3 each comprise a sensor arrangement 111, 211, 311, each comprising a radar sensor and a camera. Each control unit 102, 202, 302 is arranged to receive signals from the respective sensor arrangement 111, 211, 311. In alternative embodiments, the sensor arrangement could be a LIDAR sensor. It should be noted that the sensor arrangement can include a variety of combinations of sensors, and any number of sensors, such as a camera, lidar, radar, and/or an ultra-wideband transmitter or similar.

The sensor arrangement 111, 211, 311 may also be used to detect obstacles in a region in front of the respective vehicle. This region may include part of a lane in which the respective vehicle is travelling. Said region may also include parts of areas outside of the lane in which the respective vehicle is travelling. The region in which obstacles can be detected by the sensor arrangement 111, 211, 311 may include a part of a shoulder of the road on which the vehicles are travelling. Said region may include a part of a lane which is adjacent to the lane in which the respective vehicle is travelling. Such obstacles may be non-moving in relation to the road, or they may be moving. Also, by means of the sensor arrangement 111, 211, 311, the distance to, velocity of and acceleration of a vehicle in front of the respective vehicle may be determined. The sensor arrangement 111, 211, 311 may be arranged to detect objects on the side of the vehicle string. This may be useful to detect vehicles moving faster than the vehicle string, and driving in the same direction, in another lane, or on a motorway on-ramp.

Figure 2:
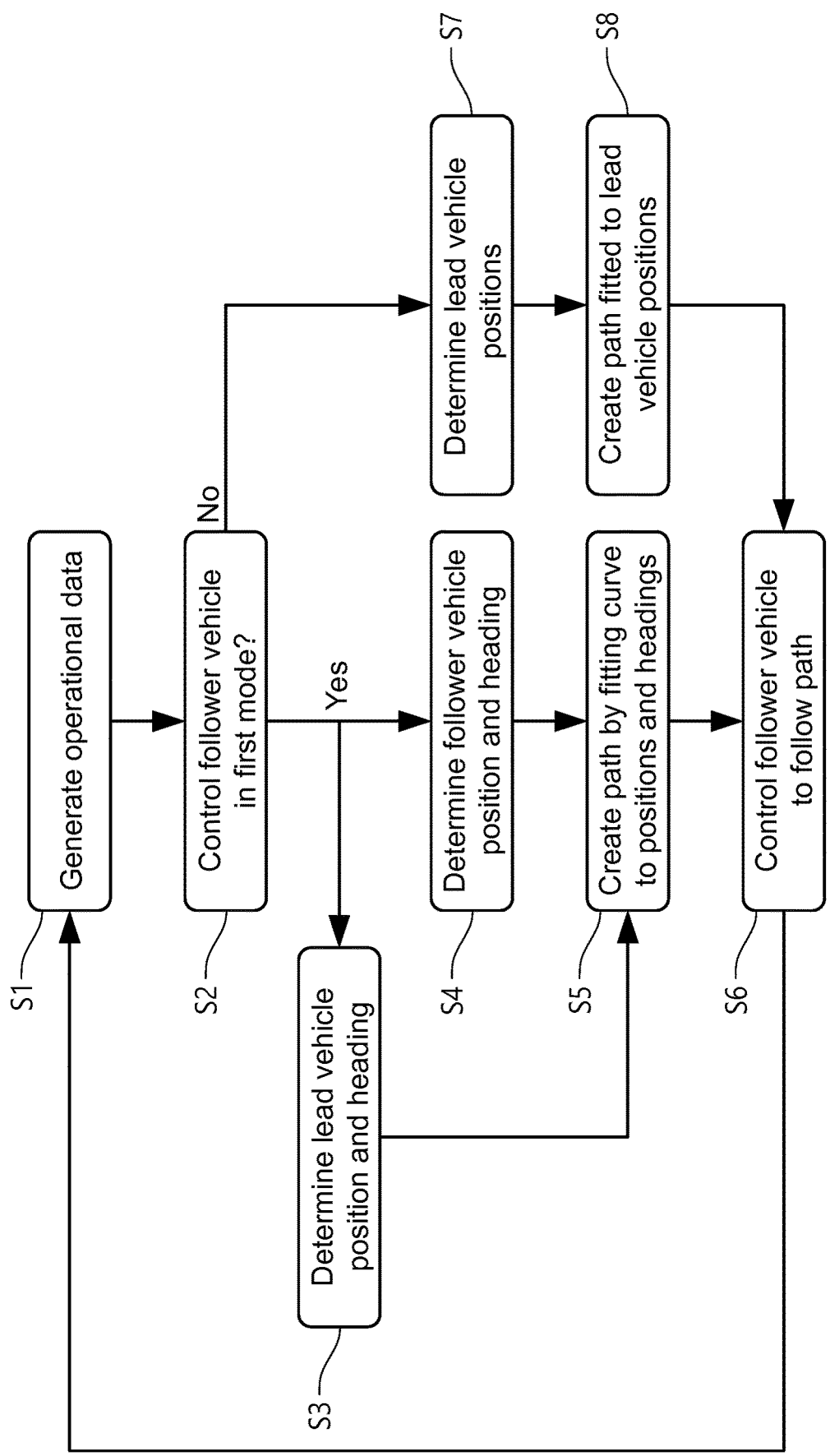
FIG. 2 is a diagram depicting steps in a method performed by the vehicles in FIG. 1.

With reference also to FIG. 2 an embodiment of a method according to the invention will be described. The lead vehicle 1 is moving along a lane of a road. The method comprises the follower vehicles 2, 3 following the lead vehicle 1. Thereby, all vehicles in the string are in the same lane.

The method comprises generating S1 operational data, as exemplified below, which is partly related to the operation of the lead vehicle 1. The operational data includes surroundings data, regarding the surroundings of the lead vehicle 1, generated by means of the sensor arrangement 111 on the lead vehicle 1. Thus, the surroundings data is generated by the lead vehicle. The operational data further includes road data, including one or more features of the road on which the vehicles are travelling. For example, the road data might include the information that the road is a motorway. The road data may be generated, by any of the vehicles 1, 2, 3, by the use of GNSS, map data and/or sensors in the respective sensor arrangement. The road data may include the number of lanes, and the intended direction of travel in the lanes. The operational data further includes lead vehicle driver data, regarding lead vehicle control actions initiated by a driver of the lead vehicle 1. The lead vehicle driver data may be generated by one or more devices arranged to register the movements of one or more driver control devices, such as a steering wheel, an accelerator pedal, a brake pedal, or a gear control device. The lead vehicle driver data may also be generated one or more parameters handled by the lead vehicle control unit, such as a requested torque.

The method further comprises determining S2 based on the operational data whether to control the first follower vehicle 2 in a first mode or in a second mode. If the road is a motorway, with curves having high radii, and where there is normally a relatively large amount of space on the sides of the vehicle, it may be determined to control the follower vehicle 2 in the first mode.

Figure 3:
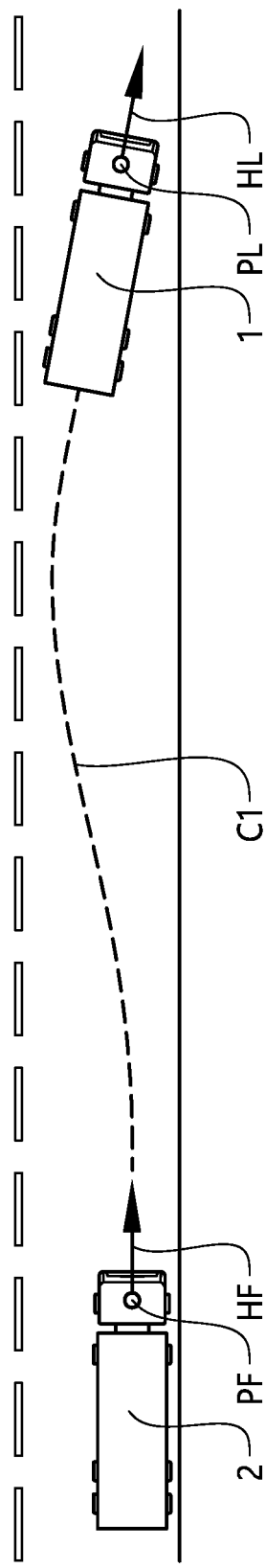
FIG. 3 is a top view of two of the vehicles in FIG. 1, in a first mode of autonomous vehicle following.

Reference is made also to FIG. 3 showing the lead vehicle 1 and the first follower vehicle 2 from above. In FIG. 3, the distance between the lead vehicle 1 and the first follower vehicle is larger than in FIG. 1, and the orientations of the vehicles are exaggerated, in order to make the understanding easier of parameters used in the method according to this embodiment of the invention.

The first mode comprises determining S3 a position PL and a heading HL of the lead vehicle 1. In this example, this is done by GNSS equipment of the lead vehicle 1. The determined lead vehicle position and heading PL, HL, are sent to the first follower vehicle 2 via the V2V communication.

Substantially simultaneously to the determination of the lead vehicle position and heading PL, HL, a position PF and a heading HF of the follower vehicle 2 is determined S4, by the follower vehicle. The positions and the headings of the lead vehicle may be matched timewise with the positions and the headings of the first follower vehicle. This may be done, e.g. by repetitively updating the respective headings and positions, time stamping the updates, and matching positions and headings of one of the vehicles with positions and headings of the other of the vehicles, having the same time stamp. Alternatively, the position and heading of the first follower vehicle could be established when data about the position and heading of the lead vehicle is received by the first follower vehicle.

Subsequently to the establishments of the position PL and heading HL of the lead vehicle 1, and the position PF and heading HF of the first follower vehicle 2, the follower vehicle creates S5 a path for the follower vehicle 2 by fitting a curve C1 to said positions PL, PF and said headings HL, HF.

The curve fitting comprises creating the curve C1 so as to be tangential to each of said headings HL, HF at a respective of said positions PL, PF. The curve C1 is a polynomial of a degree of three. This allows creating a curve which bends in one direction in one portion of the path, and in another direction in another portion of the path. When the curve C1 is created the first follower vehicle is controlled S6 so as to move along the path established by the curve.

The determination S1 of operational data is continuously repeated. Upon updates of the operational data, the determination S2, whether to control the follower vehicle 2 in the first mode or in the second mode, is continuously repeated. While the follower vehicle 2 is in the first control mode, the steps S3, S4, S5 of determining the vehicle positions and headings, and establishing a path for the follower vehicle is continuously repeated. Thus, new paths are repetitively produced. When a new path is established, it replaces the preceding path in the control of the follower vehicle.

The control in the first mode may allow the follower vehicle to deviate from the exact path of the lead vehicle. This is beneficial, e.g. in case the lead vehicle, due to irrational human control actions of a driver of the lead vehicle, moves forth and back sideways within the lane. The follower vehicle may thereby avoid or reduce such sideways movements.

It should be noted that the positions and headings of the lead and follower vehicle must not be perfectly time synchronized for the method to work. Preferably, the lead vehicle was, at some point in time, in the lead vehicle position and heading used for the curve fitting. The lead vehicle position and heading used for the curve fitting may be a present vehicle position and heading, or a historical, although preferably recent, vehicle position and heading. The lead vehicle position, used for the curve fitting, is preferably in front of the follower vehicle. However, the lead vehicle position and heading used for the curve fitting may be older than the follower vehicle position and heading used for the curve fitting.

In this example, at an update of the operational data, the operational data becomes indicative of an obstacle ahead of the lead vehicle 1. The obstacle may be e.g. a large piece of debris, or a vehicle standing still, or travelling slower than the lead vehicle. The obstacle may be in the same lane as the lead vehicle is travelling. The updated operational data may be based on signals from the sensor arrangement 111 of the lead vehicle 1. The updated operational data is sent to the follower vehicle 2. Based on the updated operational data, the control unit of the follower vehicle 2 decides to change to controlling the follower vehicle 2 in the second mode.

Figure 4:
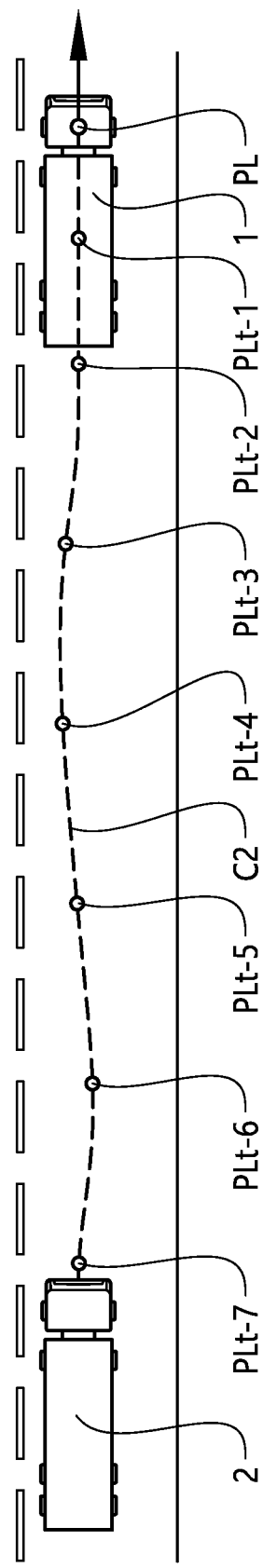
FIG. 4 is a top view of the vehicles in FIG. 3, in a second mode of autonomous vehicle following.

Reference is made to FIG. 4. The second mode comprises determining S7 a plurality of positions PL, PLt-1, PLt-2 . . . of the lead vehicle 1 as the lead vehicle moves. The lead vehicle positions are repetitively established by the lead vehicle 1 by means of GNSS. As the lead vehicle positions PL, PLt-1, PLt-2 . . . are established, they are sent to the follower vehicle by means of V2V communication.

The follower vehicle establishes S8 a path for the follower vehicle 2 by fitting a curve C2 to at least some of the plurality of lead vehicle positions PL, PLt-1, PLt-2 . . . . The curve fitting could be done in any suitable manner, such as polynomial interpolation, curve splining, or least-squares fitting. When the curve C2 is created the follower vehicle is controlled S6 so as to move along the path established by the curve.

By changing to the second control mode, the follower vehicle 2 can follow the lead vehicle more exactly, when the latter maneuvers to avoid the obstacle. Such a maneuver may involve a lane change, which is exemplified below. Thereby, it is secured that also the follower vehicle will avoid the obstacle. When the vehicles have passed the obstacle, further updated operation data may allow for the follower vehicle to resume the control in the first mode.

In a further example, the operational data is indicative of a lane change of the lead vehicle 1, while the follower vehicle 2 is controlled in the first mode. Such operational data may include data based on signals from the sensor arrangement 111 of the lead vehicle 1. For example, the camera of the sensor arrangement may provide signals indicative of the lead vehicle starting to leave the lane. The operational data may also include data about a turn signal by the lead vehicle 1. The operational data is sent to the follower vehicle 2. Thereby, the method may involve determining, based on the operational data indicative of the lane change, to change to controlling the follower vehicle 2 in the second mode.

In yet further examples, the operational data is indicative of the lead vehicle 1 entering or driving on an off-ramp or an on-ramp at a motorway, on a narrow road, or in a roundabout, while the follower vehicle 2 is controlled in the first mode. Such operational data may include data based on signals from the sensor arrangement 111 of the lead vehicle 1, the sensor arrangement 211 of the follower vehicle, and/or GNSS and map data. The method may thereby involve determining, based on such operational data, to change to controlling the follower vehicle 2 in the second mode.

In this example, the first follower vehicle 2 may, for the control of the second follower vehicle 3, wholly or partially assume the role of the lead vehicle 1 in the control of the first follower vehicle 2. Thus, in some respects, the first follower vehicle 2 can be regarded as the lead vehicle in the control of the second follower vehicle 3.

For the control of the second follower vehicle 3, the operational data may wholly or partly be generated as described above. For example, the surroundings data and the lead vehicle driver data may be generated by the lead vehicle. The operational data is sent by V2V communication to the second follower vehicle 3.

The method comprises determining based on the operational data whether to control the second follower vehicle 3 in the first mode or in the second mode. The first mode may comprise determining a position and a heading of the lead vehicle 1, and sending the determined first follower vehicle position and heading to the second follower vehicle 3 via the V2V communication. Substantially simultaneously to the determination of the first follower vehicle position and heading, a position and a heading of the second follower vehicle 3 is determined, by the second follower vehicle 3. Subsequently to the establishments of the positions and headings of the lead vehicle and the second follower vehicle, the second follower vehicle 3 creates a path for the second follower vehicle 3 by fitting a curve to said positions and said headings. Alternatively, or in addition, the first mode may comprise determining a position and a heading of the first follower vehicle 2, and sending the determined first follower vehicle position and heading to the second follower vehicle 3 via the V2V communication. Substantially simultaneously to the determination of the first follower vehicle position and heading, a position and a heading of the second follower vehicle 3 may be determined, by the second follower vehicle 3. Subsequently to the establishments of the positions and headings of the first and second follower vehicles 2, 3, the second follower vehicle 3 may create a path for the second follower vehicle 3 by fitting a curve to said positions and said headings.

Based on updated operational data, the control unit of the second follower vehicle 3 may decide to change to controlling the second follower vehicle 3 in the second mode. The second mode comprises determining a plurality of positions of the lead vehicle 1 as the lead vehicle moves. As the lead vehicle positions are established, they are sent to the second follower vehicle 3 by means of V2V communication. The second follower vehicle 3 establishes a path for the second follower vehicle by fitting a curve to at least some of the plurality of lead vehicle positions. When the curve is created the second follower vehicle 3 is controlled so as to move along the path established by the curve. Alternatively, or in addition, the second mode may comprise determining a plurality of positions of the first follower vehicle 2 as the first follower vehicle moves. As the first follower vehicle 2 positions are established, they may be sent to the second follower vehicle 3 by means of V2V communication. The second follower vehicle 3 may establish a path for the second follower vehicle by fitting a curve to at least some of the plurality of first follower vehicle positions. When the curve is created the second follower vehicle 3 may be controlled so as to move along the path established by the curve.

Figure 5:
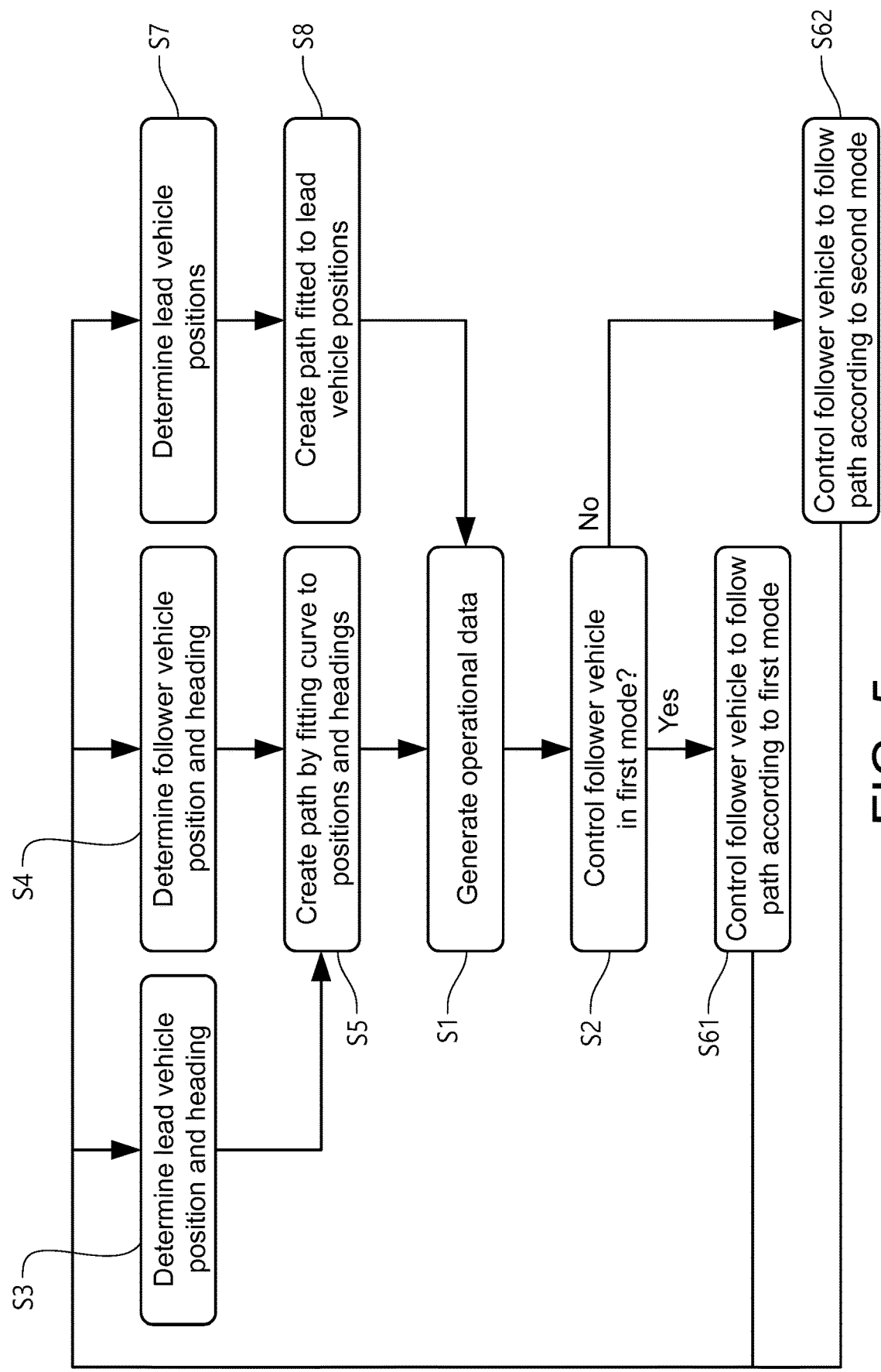
FIG. 5 is a diagram depicting steps in a method according to an alternative embodiment of the invention.

Reference is made to FIG. 5. In some embodiments, paths may be determined in parallel according to both modes described above. This could mean that the path in the second mode is established while controlling the follower vehicle 2 so as to move along the path established in the first mode. For example, the method may comprise determining S3 a position and a heading of the lead vehicle, determining S4 a position and a heading of the follower vehicle, and subsequently establishing S5 a path for the follower vehicle by fitting a curve to said positions and said headings. Simultaneously, or in parallel, a plurality of positions of the lead vehicle may be determined S7 as the lead vehicle moves, and a path for the follower vehicle 2 may be established S8 by fitting a curve to at least some of the plurality of lead vehicle positions.

Operational data S1 is determined, e.g. as exemplified above. Based on the operational data, it is determined S2 whether to control the vehicle in the first mode. If it is determined to control the follower vehicle 2 in the first mode, the follower vehicle is controlled S61 so as to follow the path created S5 according to the algorithm of the first mode. If it is determined S2 to control the follower vehicle 2 in the second mode, the follower vehicle is controlled S62 so as to follow the path created S8 according to the algorithm of the second mode. Thereby, the path estimation in one of the modes is actively used, while the path estimation in the other mode is passive.

Figure 6:
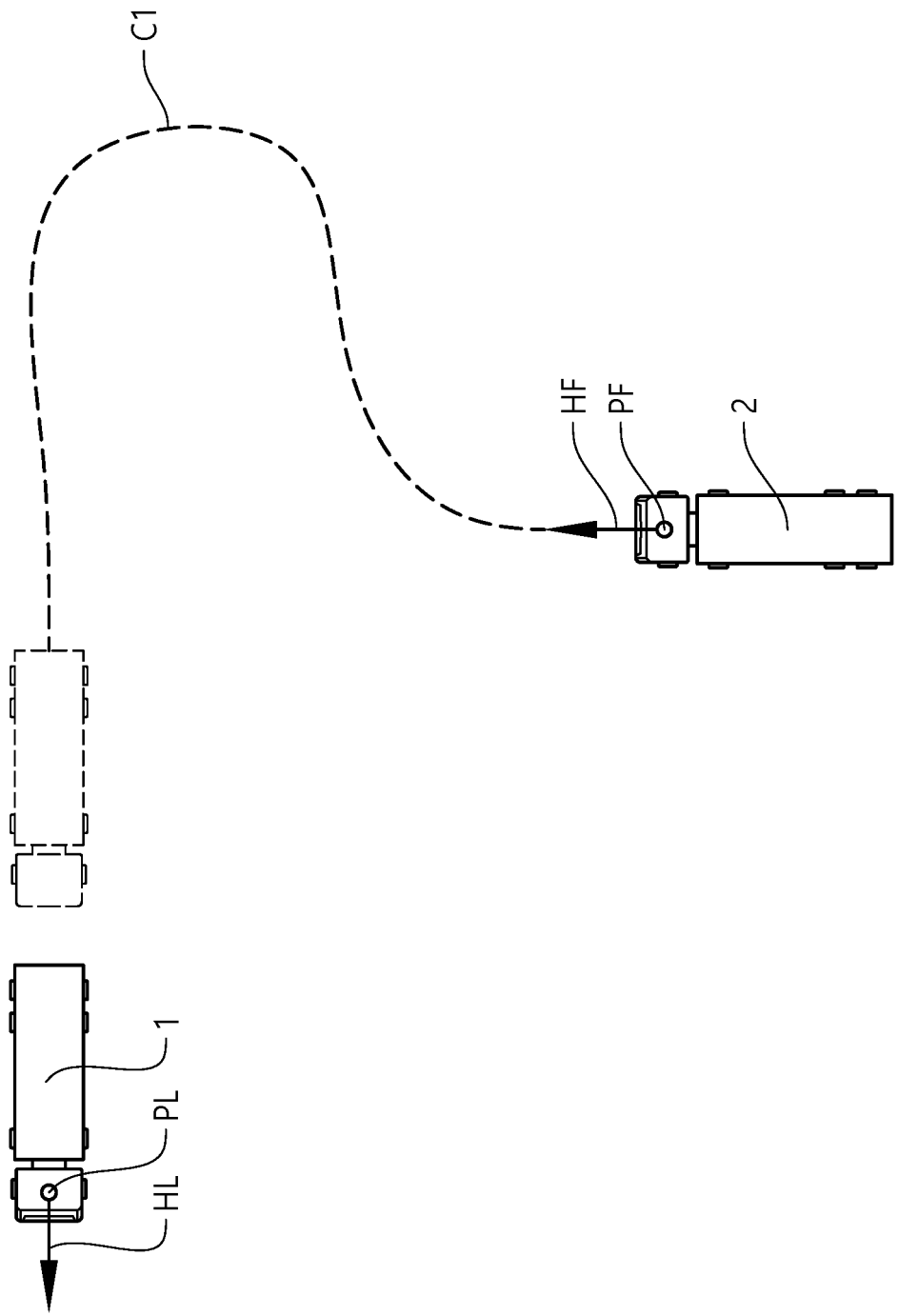
FIG. 6 is a top view of two vehicles about to initiate a string of platooning vehicles.
Figure 7:
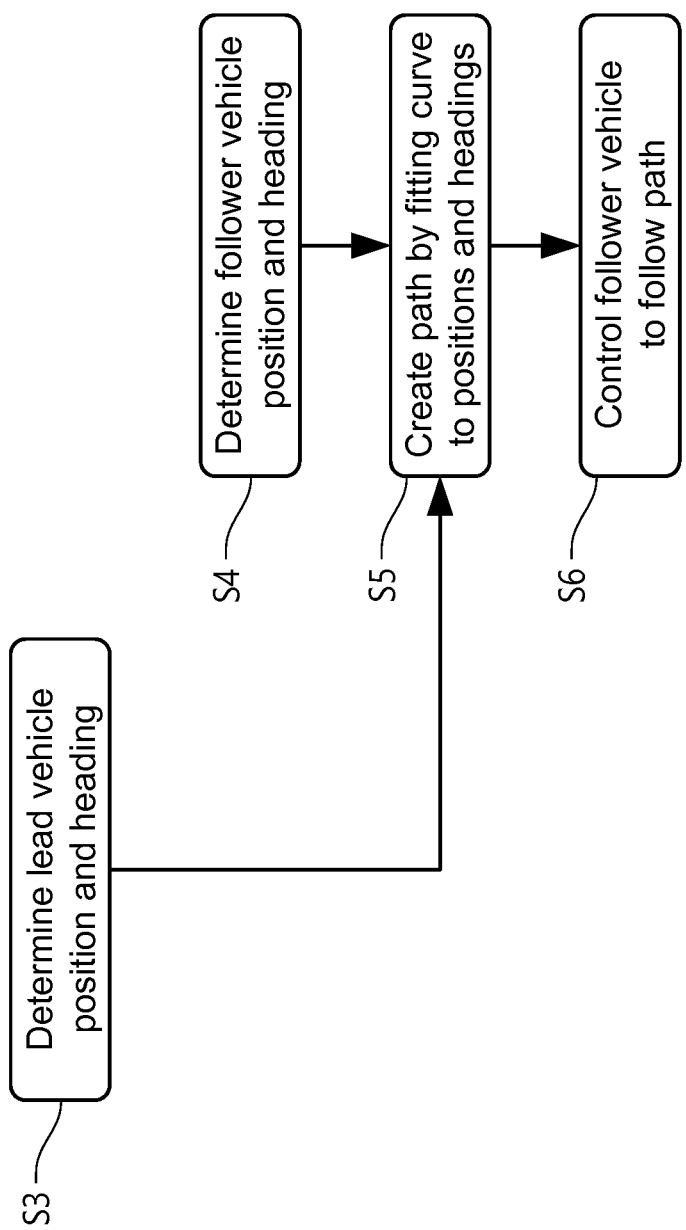
FIG. 7 is a block diagram depicting steps in a method to control one of the vehicles in FIG. 6.

Reference is made to FIG. 6 and FIG. 7. FIG. 6 shows an example of a situation, where a string for vehicle platooning is to be initiated. A vehicle 1 is to become the lead vehicle of the string, i.e. the vehicle travelling in the front of the string. The lead vehicle 1 is standing still. The position of the lead vehicle is determined S3. The heading of the lead vehicle was established S3 when the lead vehicle parked in the position in which it is standing still. The heading is stored in a memory accessible to the control unit of the lead vehicle. The lead vehicle heading, and the lead vehicle position is sent, via V2V communication, to another vehicle 2, which is to become a follower vehicle in the string. The position and heading of the follower vehicle 2 are established S4. Subsequently a path for the follower vehicle 2 is established by fitting a curve C1 to said positions and said headings. Thereupon, the follower vehicle 2 is controlled so as to move along the established path.

Thereby the follower vehicle may park behind the lead vehicle, before the platooning starts.

It is to be understood that the present invention is not limited to the embodiments described above and illustrated in the drawings; rather, the skilled person will recognize that many changes and modifications may be made within the scope of the appended claims.

The invention claimed is:

1. A method for a follower vehicle following a lead vehicle, comprising:
   determining, by a control unit, a position and a heading of the lead vehicle;
   determining, by the control unit, a position and a heading of the follower vehicle;
   establishing, by the control unit, a first path for the follower vehicle by fitting a curve to the positions and the headings;
   controlling, by the control unit, the follower vehicle to move along the established first path, wherein said first path is established in a first mode of the follower vehicle;
   generating operational data which is at least partly related to the operation of the lead vehicle, wherein the operational data includes at least one of:
   surroundings data, regarding the surroundings of the lead vehicle and/or the follower vehicle;
   road data, including one or more features of a road on which the vehicles are travelling; and
   lead vehicle driver data, regarding lead vehicle control actions initiated by a driver of the lead vehicle;

determining, by the control unit, based on the operational data whether to control the follower vehicle in the first mode or in a second mode by determining if the road data and/or the surroundings data indicate that the follower vehicle is in a relatively narrow situation; and in response to determining at least one of the road data and the surroundings data indicate that the follower vehicle is in a relatively narrow situation, controlling, by the control unit, the follower vehicle in the second mode comprising:

determining, by the control unit, a plurality of positions of the lead vehicle as the lead vehicle moves;

establishing, by the control unit, a second path for the follower vehicle by fitting a curve to at least some of the plurality of lead vehicle positions; and controlling, by the control unit, the follower vehicle to move along the established second path.

2. The method of claim 1, wherein the curve fitting comprises creating the curve so as to be tangential to each of the headings at a respective of the positions.

3. The method of claim 1, wherein the curve is a polynomial of a degree of at least three.

4. The method of claim 1, wherein at least part of the operational data is generated by the lead vehicle.

5. The method of claim 1, wherein the operational data includes surrounding data generated by the lead vehicle.

6. The method of claim 1, wherein at least one part of the operational data is sent from the lead vehicle to the follower vehicle by vehicle-to-vehicle communication.

7. The method of claim 1,
wherein the operational data is indicative of a change of a lead vehicle control strategy, from a first lead vehicle control strategy to a second lead vehicle control strategy, while the follower vehicle is controlled in the first mode, the method further comprising determining, by the control unit, based on the operational data indicative of the lead vehicle control strategy change, to change to controlling the follower vehicle in the second mode.

8. The method of claim 7, wherein the operational data indicative of the lead vehicle control strategy change includes data based on a sensor of the lead vehicle.

9. The method of claim 7, wherein the operational data indicative of the lead vehicle control strategy change includes data about a turn signal by the lead vehicle.

10. The method of claim 1,
wherein the operational data is indicative of an obstacle ahead of the lead vehicle, while the follower vehicle is controlled in the first mode, the method further comprising determining, based on the operational data indicative of the obstacle, to change to controlling the follower vehicle in the second mode.

11. The method of claim 1,
wherein the operational data is indicative of the lead vehicle entering or driving on an off-ramp or an on-ramp at a motorway, while the follower vehicle is controlled in the first mode, and the method further comprising determining based on the operational data, indicative of the lead vehicle entering or driving on the off-ramp or the on-ramp, to change to controlling the follower vehicle in the second mode.

12. The method of claim 1, further comprising establishing, by the control unit, the second path in the second mode while controlling the follower vehicle to move along the first path established in the first mode.

* * * * *